(12) United States Patent
Stephen et al.

(10) Patent No.: US 6,694,967 B2
(45) Date of Patent: Feb. 24, 2004

(54) MOVABLE SUPPORT FOR BARBECUE GRILL FUEL TANK

(75) Inventors: James C. Stephen, Arlington Heights, IL (US); Ewald Sieg, Palatine, IL (US); Mario Gonzalez, Elgin, IL (US)

(73) Assignee: Weber-Stephen Products Company, Palatine, IL (US)

(*) Notice: Subject to any disclaimer, the term of this patent is extended or adjusted under 35 U.S.C. 154(b) by 0 days.

(21) Appl. No.: 10/014,690

(22) Filed: Dec. 11, 2001

(65) Prior Publication Data

US 2003/0106547 A1 Jun. 12, 2003

(51) Int. Cl.[7] .............................. F24C 5/20; F24C 1/16
(52) U.S. Cl. ..................... 126/41 R; 126/38; 126/276
(58) Field of Search .................. 126/41 R, 38, 126/276, 39 B, 25 R, 30, 9 R; 248/289.11, 290.1

(56) References Cited

U.S. PATENT DOCUMENTS

| | | | |
|---|---|---|---|
| 4,322,049 A | * | 3/1982 | Holland et al. .............. 248/154 |
| 4,544,173 A | * | 10/1985 | Kellermyer .............. 280/47.33 |
| 4,770,428 A | * | 9/1988 | Sugiyama ................... 280/834 |
| 4,934,333 A | | 6/1990 | Ducate, Jr. et al. |
| 5,076,252 A | | 12/1991 | Schlosser et al. |
| 5,318,322 A | | 6/1994 | Home |
| 5,408,985 A | | 4/1995 | Giebel et al. |
| 5,458,309 A | | 10/1995 | Craven, Jr. et al. |
| 5,765,469 A | | 6/1998 | Schlosser et al. |
| 5,799,849 A | * | 9/1998 | Beer et al. ................... 224/403 |
| 5,873,355 A | | 2/1999 | Schlosser et al. |
| 5,931,149 A | | 8/1999 | Lewis |
| 5,934,184 A | * | 8/1999 | Schlosser et al. .............. 99/385 |
| 5,960,782 A | * | 10/1999 | Clements et al. ......... 126/37 B |
| 6,148,668 A | | 11/2000 | Sieg |
| 6,293,273 B1 | | 9/2001 | Byrne et al. |

* cited by examiner

Primary Examiner—Alfred Basichas
(74) Attorney, Agent, or Firm—Wallenstein, Wagner & Rockey, Ltd.

(57) ABSTRACT

The present invention provides a support apparatus for a fuel tank used in connection with a gas barbecue grill assembly. The support apparatus is connected to a portion of the frame assembly of the grill assembly. The support apparatus comprises a housing member with a bracket adapted to engage a portion of the fuel tank and a releasable member operably connected to the housing member. At least one pivot axis member operably connects the support apparatus to a portion of the frame assembly. The support apparatus is rotatable about a generally vertical axis between a first position wherein the fuel tank is substantially within the frame assembly and stored for use, and a second position wherein the fuel tank is substantially beyond the frame assembly and accessible for removal and replacement. The releasable member is adapted to secure the support apparatus in either the first position or the second position.

29 Claims, 6 Drawing Sheets

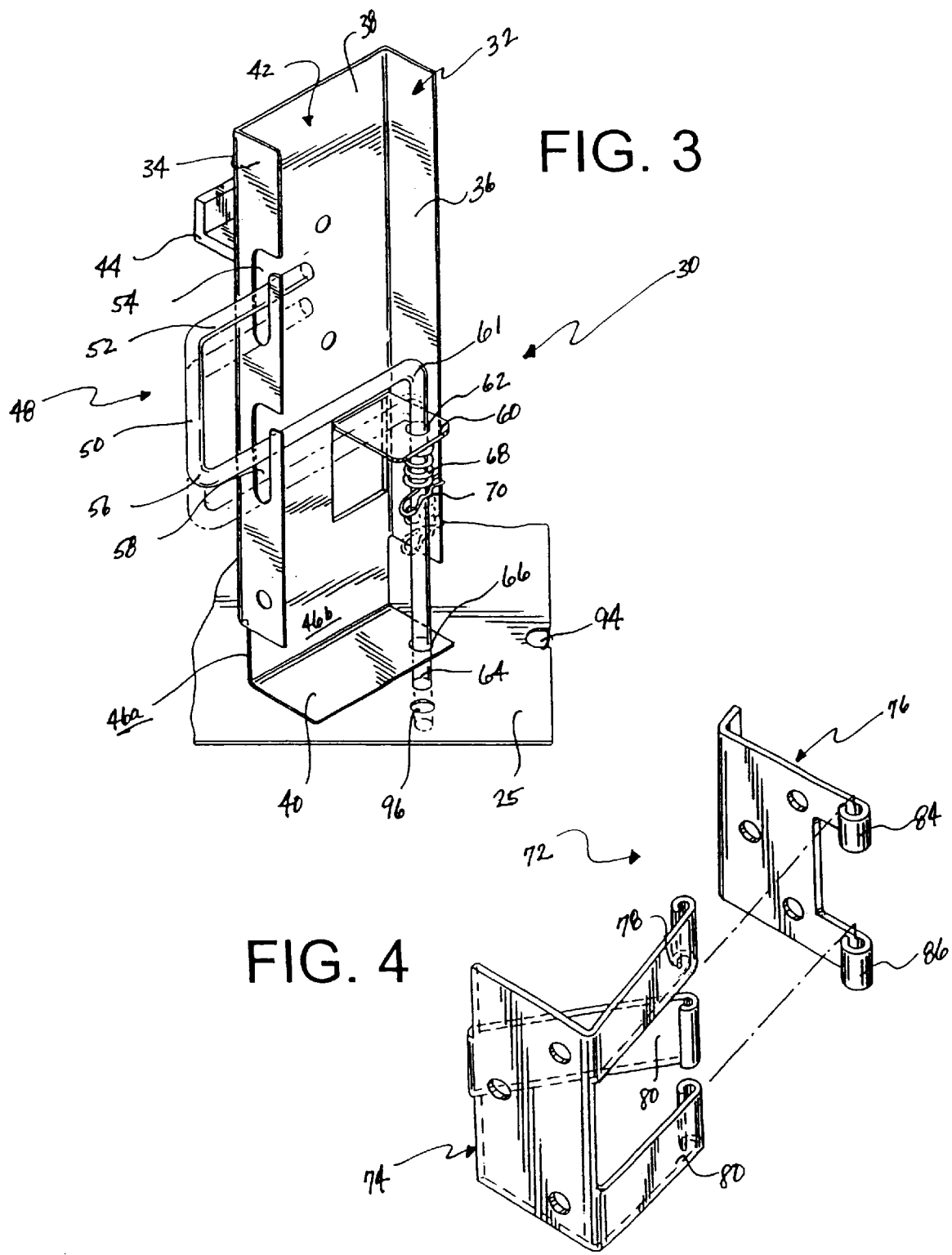

MOVABLE SUPPORT FOR BARBECUE GRILL FUEL TANK

CROSS-REFERENCE TO RELATED APPLICATIONS

Not Applicable.

FEDERALLY SPONSORED RESEARCH OR DEVELOPMENT

Not Applicable.

TECHNICAL FIELD

The present invention relates to a support for a fuel tank used in connection with a barbecue grill. More specifically, the present invention relates to a movable support for fuel tank that is capable of movement between at least two positions.

BACKGROUND OF THE INVENTION

Over the past two to three decades, the popularity of gas barbecue grills and outdoor cooking devices has increased tremendously. Manufacturers of these products have introduced a number of support devices for the fuel tank used in connection with the grills and cooking devices. However, conventional support devices suffer from a number of problems and limitations. Most conventional support devices are affixed to a portion of the frame assembly of the barbecue grill or the cooking device, typically a vertical frame member. In this manner, the support device and the fuel tank are exposed to potentially harsh outdoor elements. Also, the vertical frame member must be specifically designed or reinforced to withstand the increased loads presented by the support device and the fuel tank. Because most frame assemblies are formed from a plurality of frame members, access to a spent fuel tank is compromised when the support device is affixed to the frame assembly.

A number of larger gas barbecue grills have a frame assembly which includes a cabinet or a storage cavity where the fuel tank is simply placed therein. In this manner, the fuel tank remains unsecured and susceptible to unexpected movement. Alternatively, a conventional support device is permanently affixed to an internal frame member comprising the cabinet. In either case, the structure of the cabinet impairs the access to and replacement of a spent fuel tank.

An example of a support device susceptible to the limitations identified above is U.S. Pat. No. 5,873,355 to Schlosser et al., which is assigned to the Assignee of the present invention. As shown in FIGS. 12 and 13 therein, a support device 28 for a fuel tank 24 includes an elongated U-shaped portion 62 with a curved lower portion 62 and a strap 68. The support device 28 is a stationary element that is affixed to a lower portion of the support frame 14. Referring to FIG. 1, the fuel tank 24 is positioned beyond the cavity defined by the support frame 14 and beneath the work surface 20 and the horizontal frame member 42a. Consequently, the removal and replacement of the fuel tank 24 is compromised.

Another example of a support device with the concerns identified above is U.S. Pat. No. 5,765,469 to Schlosser et al., which is assigned to the Assignee of the present invention. As shown in FIGS. 2 and 4, the support device 910 includes a brace 911, a tank scale 913, and a bracket 915. The brace 911 wraps around and hangs from the horizontal post 26 between the vertical posts 23, 24. Referring to FIG. 2, the fuel tank 900 is supported by the device 910 beyond the cavity defined by the support frame 20 and beneath the handles 31a. Accordingly, the removal and replacement of the fuel tank 24 is negatively affected.

Yet another example of a support device susceptible to the problems identified above is U.S. Pat. No. 5,076,252 to Schlosser et al., which is assigned to the Assignee of the present invention. As shown in FIG. 7, the support device includes an upper bracket 87 and a lower bracket 88. The support device is affixed to a vertical frame member 86 which is a component of the cart frame assembly 50. Referring to FIGS. 1, 2, and 4, the fuel tank 72 is supported by the device in the cavity defined by the frame assembly 50; however, neither the fuel tank 72 nor the support device are movable. The fuel tank 72 is positioned in close proximity to the storage bin 80 and the shrouding 58, each of which hamper the removal and replacement of the fuel tank 72.

The unrestrained placement of a fuel tank within a cabinet of a barbecue grill assembly is shown in U.S. Pat. No. 4,934,333 to Ducate et al. As show in FIG. 2, the fuel tank 58 is positioned on a bottom wall of the cabinet 11. Although fuel lines 60, 62 are connected to the fuel tank 58 to provide fuel to the burners of the barbecue grill 10, no structure is provided to secure or stabilize the fuel tank 58. Consequently, the fuel tank 58 is susceptible to unwanted and unexpected movement. In addition, the removal and replacement of a spent fuel tank 58 is made difficult by the structure of the cabinet 11, including the doors 52, 54, 56 and the vertical frame members 26.

Therefore, there is a definite need for a support device for a fuel tank that is movable between a first position wherein the fuel tank is stored for use, and a second position, wherein the fuel tank is accessible. In addition, there is a need for a support device that provides for generally unobstructed removal and replacement of a spent fuel tank.

The present invention is provided to solve these and other problems.

SUMMARY OF THE INVENTION

The present invention relates to a movable support apparatus for a fuel tank used in connection with a gas barbecue grill assembly or an outdoor cooking device. The support apparatus includes a housing member having opposed side walls, a back wall, and a bottom wall. A bracket is affixed to an outer surface of the back wall and is adapted to engage an opening of the fuel tank. The bracket is adapted to secure the fuel tank to the support apparatus.

A releasable securing member is operably connected to the housing member. The securing member is adapted to provide securement to the housing member such that the position of the support apparatus remains generally fixed. Described in a different manner, when the securing member is properly engaged, the support apparatus is generally immobile. When the securing member is disengaged, the support apparatus is capable of movement. The securing member has a handle portion that is adapted to actuate the securing member. An intermediate portion of the securing member is operably connected to a portion of the support apparatus. A lower portion of the securing member extends through an aperture in the bottom wall.

In accord with the invention, the support apparatus is operably connected to the frame assembly of the gas barbecue grill assembly, where the frame assembly generally comprises a combination of vertical frame members, transverse frame members, and horizontal frame members. The frame assembly, including the vertical, transverse, and horizontal frame members define a cabinet, which is positioned generally below the cooking chamber of the barbecue grill assembly. At least one hinge is adapted to operably connect the support apparatus to a portion of the cabinet, preferably a portion of the vertical frame member.

In further accord with the invention, the support apparatus is movable between a first position, wherein the fuel tank is generally stored for use and a second position, wherein the fuel tank is generally accessible. In the first position, the support apparatus and the fuel tank are positioned generally within the cabinet. Described in another manner, in the first position, the support apparatus and the fuel tank are positioned generally within the frame assembly. When the support apparatus is in the first position, the fuel tank is secured for use with the grill assembly.

The support apparatus is secured in the first position by the engagement of the securing member with a bottom wall of the cabinet. The bottom wall has a first means for receiving the lower portion of the securing member. When the support apparatus is located in the first position the support apparatus is generally fixed or immobile.

In the second position, a portion of the support apparatus is positioned generally beyond a portion of the cabinet. Described in another manner, in the second position, a portion of the support apparatus is positioned generally beyond a portion of the frame assembly, and the fuel tank is positioned generally beyond the frame assembly. When the support apparatus is in the second position, the fuel tank is accessible, meaning that a user can detach and/or remove a spent fuel tank from the support apparatus. Also, no portion of the frame assembly obstructs the removal of the spent fuel tank. A replacement fuel tank can then be secured to the support apparatus.

The support apparatus is secured in the second position by the engagement of the securing member with the bottom wall of the cabinet. The bottom wall has a second means for receiving the lower portion of the securing member. When the lower portion is received by the second receiving means, the support apparatus is located in the second position wherein the fuel tank is accessible for removal and/or replacement.

The support apparatus is movable between the first and second positions by actuating the releasable securing member. To move the support apparatus from the first position to the second position, a user engages the handle portion of the securing member and actuates it upward an amount sufficient to disengage the lower portion from the first receiving means. To move the support apparatus from the second position to the first position, a user engages the handle portion and actuates it upward an amount sufficient to disengage the lower portion from the second receiving means.

The support apparatus of the present invention provides a number of significant advantages over conventional fuel tank support devices. One such advantage is the ability to rotate the support apparatus from a use position (first position) to an access position (second position) such that a spent fuel tank can be removed and replaced. Another advantage is the ability to rotate the support apparatus from the access position to the use position once the replacement fuel tank is connected to the support apparatus. Yet another advantage provided by the support apparatus is positioning the fuel tank within the cabinet in the use position to preclude exposure to outdoor elements.

Other features and advantages of the invention will be apparent from the following specification taken in conjunction with the following drawings.

BRIEF DESCRIPTION OF THE DRAWINGS

FIG. 3 is a perspective view of the support apparatus of FIG. 2;

FIG. 4 is an exploded view of a hinge used to connect the support apparatus of FIG. 2 to the barbecue grill assembly of FIG. 1;

DETAILED DESCRIPTION OF THE INVENTION

Figure 1:
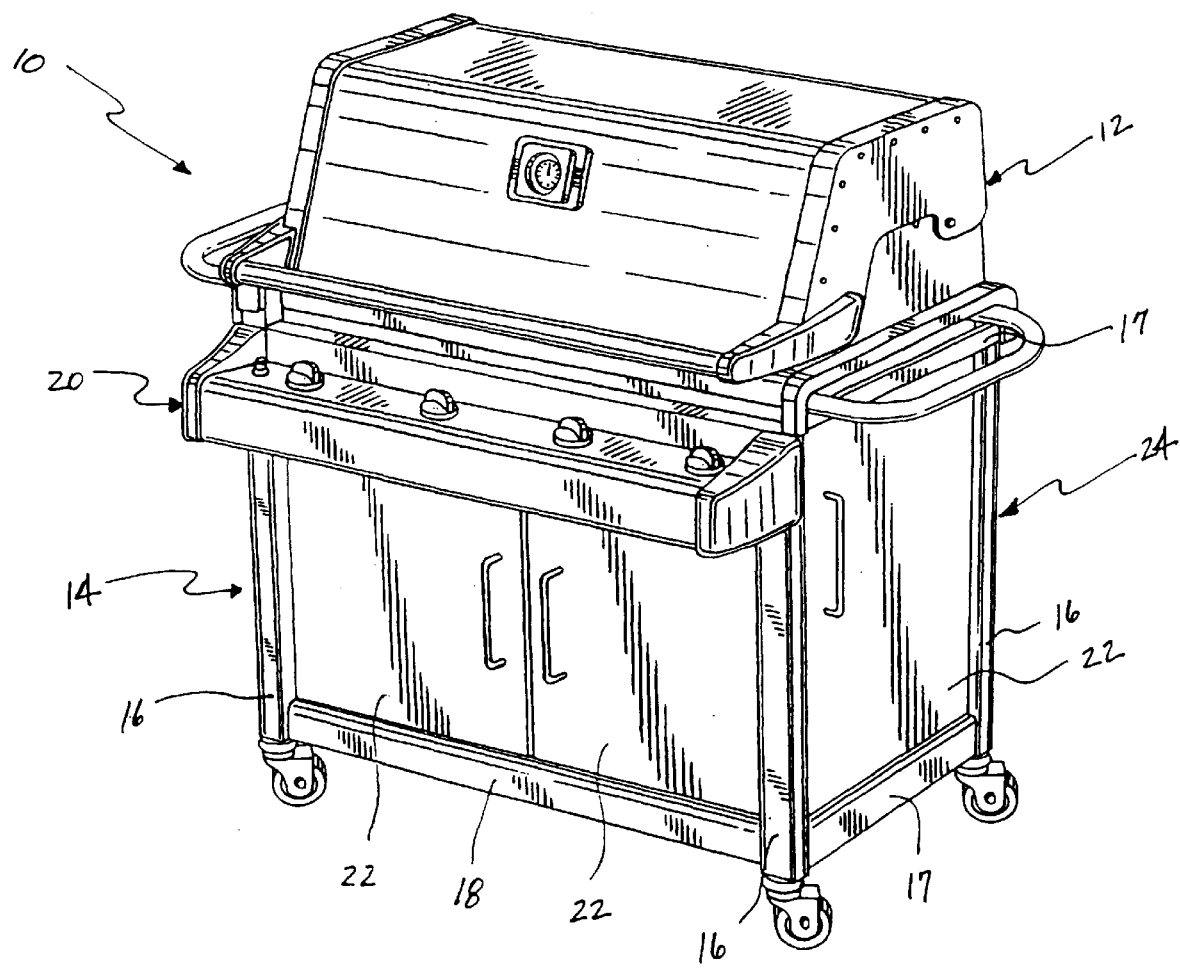
FIG. 1 is a perspective view of a barbecue grill assembly.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

A barbecue grill assembly 10 is shown in FIG. 1. The barbecue grill assembly 10 generally includes a cooking chamber 12 and a frame assembly 14. The frame assembly 14 is adapted to provide support to the cooking chamber 12. The frame assembly 14 includes a combination of vertical frame members 16, transverse frame members 17, and horizontal frame members 18. The barbecue grill assembly 10 further includes a control panel 20, which is affixed to a portion of the frame assembly 14.

The frame assembly 14 defines a cabinet or cavity 24 as the interior space between the vertical, transverse, and horizontal frame members 16, 17, 18. The cabinet 24 provides storage space or capacity for a fuel tank 26 (see FIG. 2) and other accessories, such as cooking utensils (not shown), which are used in connection with the barbecue grill assembly 10. The cabinet 24 is positioned generally below the cooking chamber 12, however, the cabinet 24 can laterally extend beyond the cooking chamber 12. Although the frame assembly 14 is shown as having a plurality of doors 22, the doors 22 can be omitted such that the cabinet 24 is partially or fully unenclosed. When the doors 22 are omitted, the innards of the cabinet 24 are visible. The cabinet 24 includes a back wall 23, which generally defines a rear boundary of the cabinet 24. The cabinet 24 further includes a bottom wall 25, which generally defines a lower boundary of the cabinet 24.

As shown in FIG. 1, the frame assembly 14 and the cabinet 24 have a generally rectangular configuration. However, the configuration of the frame assembly 14 and the cabinet 24 can vary with the design parameters of the barbecue grill assembly 10. In addition, the frame assembly 14 and the resulting cabinet 24 can extend beyond the dimensions of the cooking chamber 12. In this configuration, the frame assembly 14 can support a plurality of auxiliary burners and controls as well as the cooking chamber 12.

Figure 2:
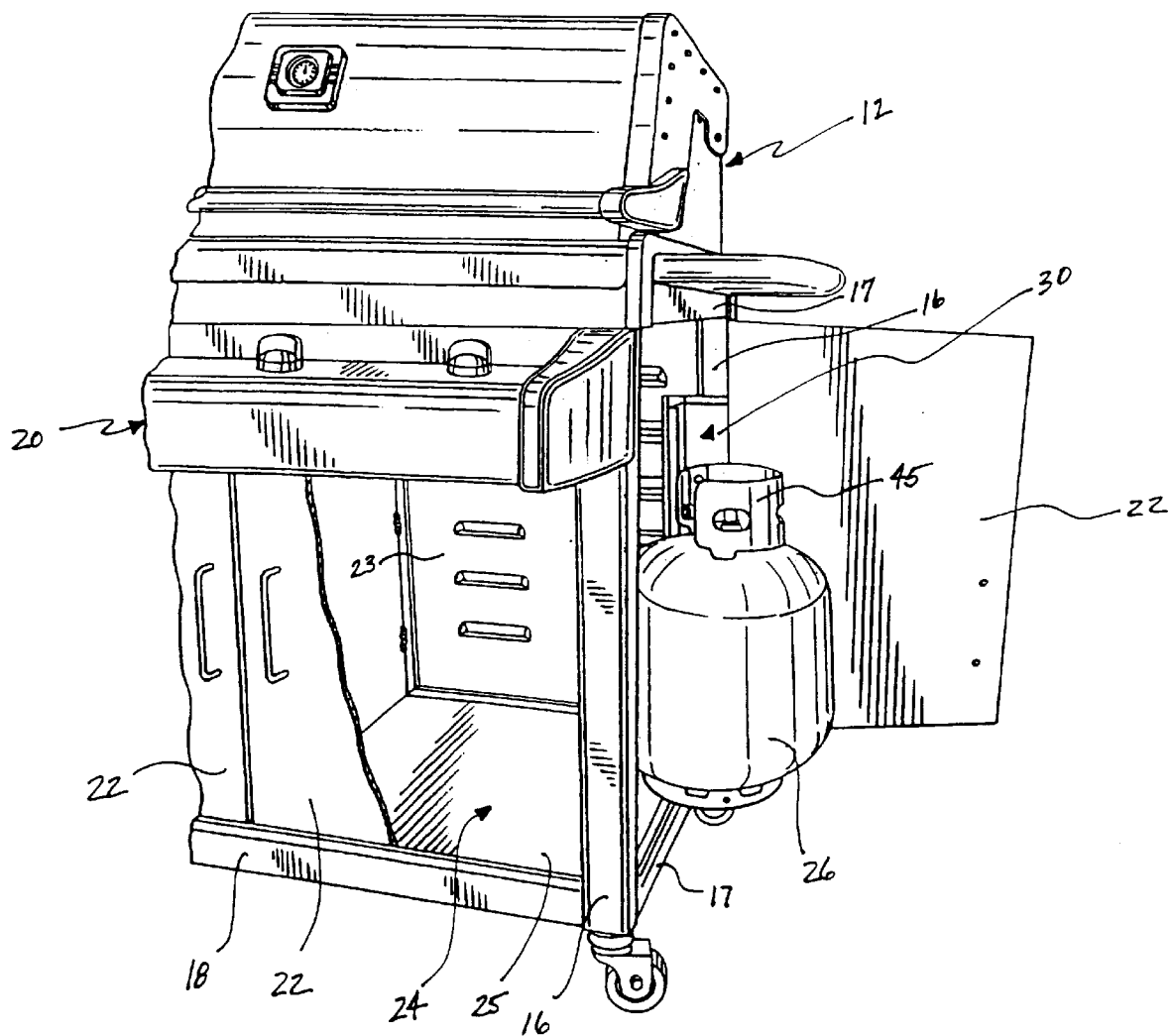
FIG. 2 is a perspective view of a support apparatus of the invention, showing the support apparatus positioned in the barbecue grill assembly of FIG. 1.

A movable support apparatus 30 for the fuel tank 26 is first shown in FIG. 2. Referring to FIG. 3, the support apparatus 30 includes a housing member 32. The housing member 32 has opposed side walls 34, 36, a generally vertical outer or back wall 38, and a bottom wall 40 which generally define a channel 42. A bracket 44 is affixed to an outer surface 46a of the back wall 38. The bracket 44 is adapted to engage an opening in a collar 45 of the fuel tank 26 to secure the fuel tank 26 to the support apparatus 30. Alternatively a tank scale 100 (see FIGS. 5, 6, and 9) is affixed to the outer surface 46a of the back wall 38 and is adapted to engage the opening in the collar 45. The tank scale 100 includes an internal spring and an indicator device for indicating the amount of fuel remaining in the fuel tank 26. Accordingly, the support apparatus 30 is adapted to be coupled with the tank scale 100.

A releasable securing member 48 is operably connected to the housing member 32. The securing member 48 is adapted to provide securement to the housing member 32 such that the position of the support apparatus 30 remains generally fixed. Described in a different manner, when the securing member 48 is properly engaged, the support apparatus 30 is generally immobile. In contrast, when the securing member 48 is disengaged, the support apparatus 30 is capable of movement. Accordingly, engagement of the securing member 48 generally precludes movement of the support apparatus 30.

Referring to FIG. 3, the securing member 48 has a handle portion 50 that is adapted to actuate the securing member 48. A first segment 52 of the handle portion 50 is received by a first slot 54 in the sidewall 34. A second segment 56 of the handle portion 50 is received by a second slot 58 in the sidewall 34. The slots 54, 58 are adapted to permit limited movement of the handle portion 50. Accordingly, the slots 54, 58 and the first and second segments 52, 56 of the handle portion 50 are adapted for slidable engagement.

A tab 60 extends from an inner surface 46b of the back wall 38. An intermediate portion 61 of the securing member 48 is operably connected to a portion of the support apparatus 30, preferably the tab 60. An aperture 62 in the tab 60 is adapted to receive a portion of the intermediate portion 61 of the securing member 48. The intermediate portion 61 and the aperture 62 are adapted for slidable engagement.

A lower portion 64 of the securing member 48 extends through an aperture 66 in the bottom wall 40. As shown in FIG. 3, the aperture 66 of the bottom wall 40 and the aperture 62 of the tab 60 are cooperatively positioned to provide for slidable movement of the intermediate and lower portions 52, 64 of the securing member 48. Means for biasing 68 the securing member 48 is operatively connected to the securing member 48. The biasing means 68 can be a helical spring or similar structure that provides repetitive biasing of the securing member 48. A retaining clip 70 retains the biasing means 68 in an operational position. The lower portion 64 is adapted to be received by an aperture 96 in the bottom wall 25 of the cabinet 24.

Referring to FIG. 4, at least one pivot axis member or hinge 72 is adapted to operably connect the support apparatus 30 to a portion of the frame assembly 14. The hinge 72 includes a first piece 74 that is affixed to a portion of the support apparatus 30 and a second piece 76 that is affixed to a portion of the cabinet 24, preferably a portion of the vertical frame member 16. The first piece 74 includes a first arm 78, a second arm 80, and a third arm 82, wherein each arm 78, 80, 82 has a rolled end adapted to receive a pin (not shown). The second piece 76 includes a first arm 84 and a second arm 86, where each arm 84, 86 has a rolled end adapted to receive the pin.

Figure 5:
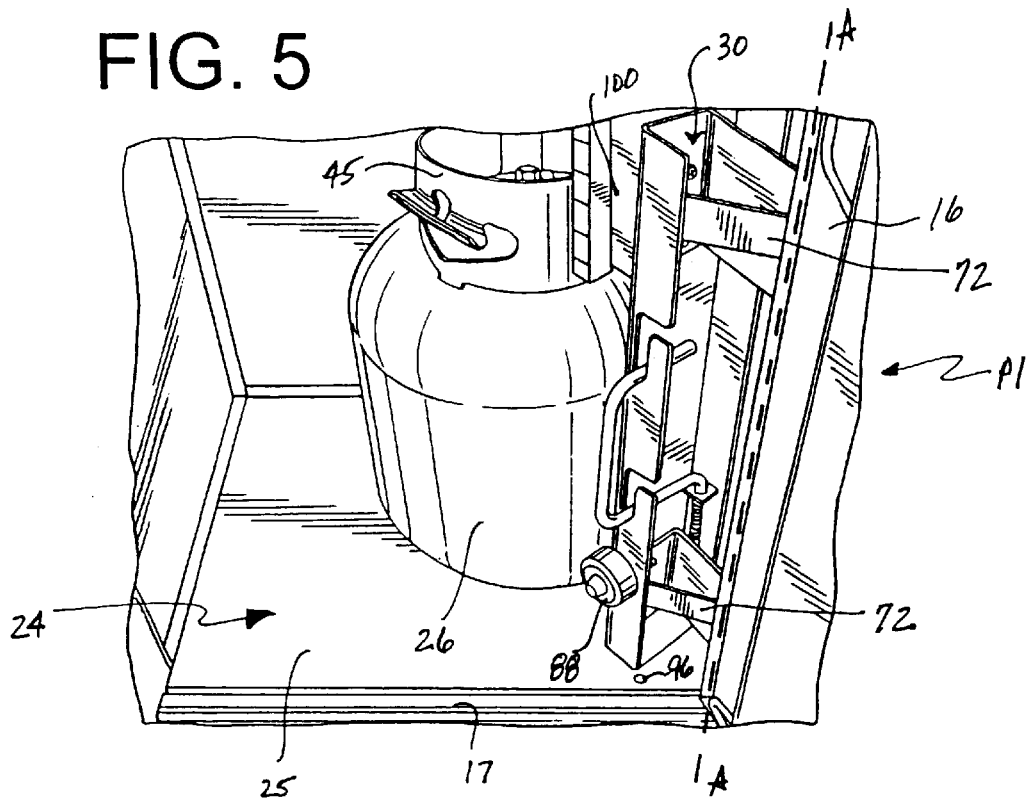
FIG. 5 is a perspective view of the support apparatus of FIG. 2 and a fuel tank, showing the support apparatus and the fuel tank in a first position.

Referring to FIG. 5, a first hinge 72 connects an upper portion of the support apparatus 30 to an upper portion of the vertical frame member 16, and a second hinge 72 operably connects a lower portion of the support apparatus 30 to a lower portion of the vertical frame member 16. The hinge 72 is further adapted to provide for pivotal movement or rotation of the support apparatus 30 about a vertical axis A—A.

Figure 6:
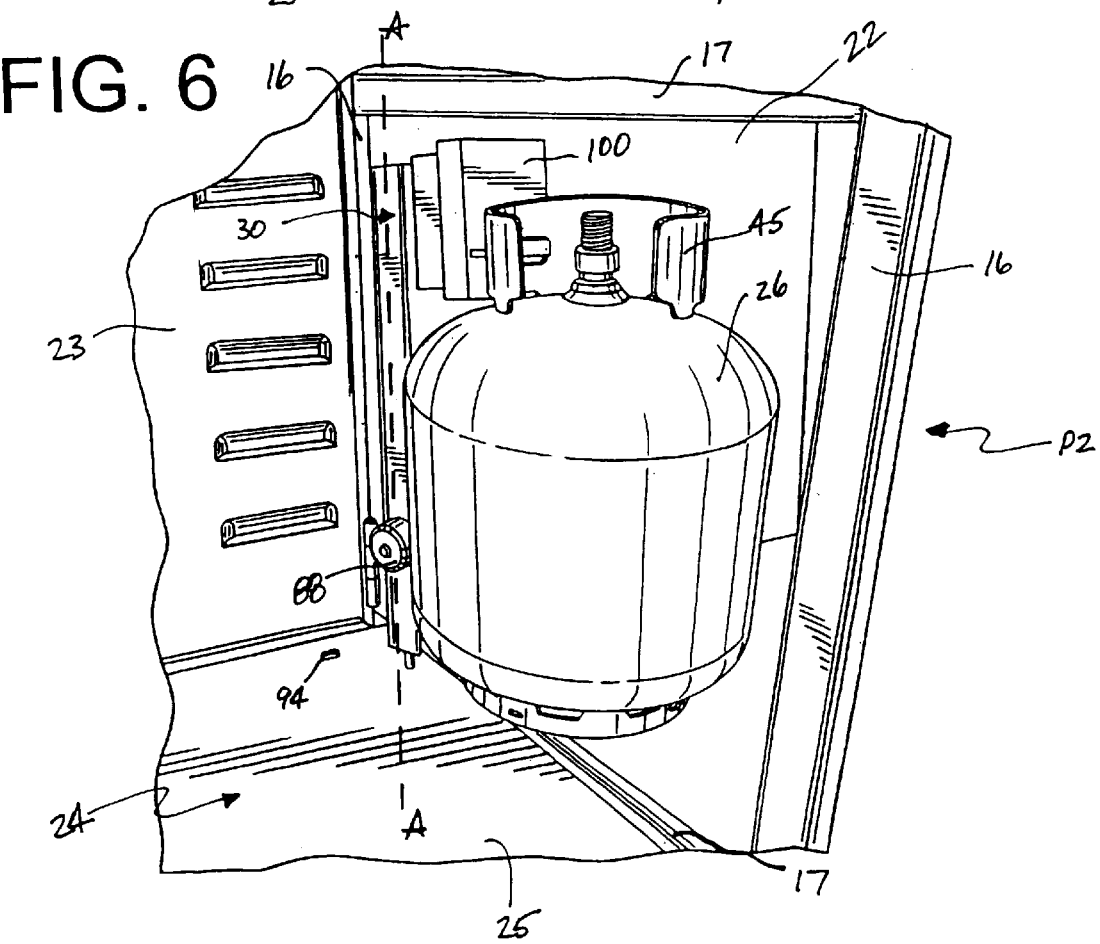
FIG. 6 is a perspective view of the support apparatus of FIG. 2 and the fuel tank, showing the support apparatus and the fuel tank in a second position.

In a preferred embodiment, the support apparatus 30 further includes at least one caster or wheel 88, preferably located on a lower portion of the support apparatus 30. As shown in FIGS. 5 and 6, a first wheel 88 is positioned proximate the side wall 34. A second wheel 90 is positioned proximate the side wall 36. The wheels 88, 90 are positioned coincident with a lower portion of the fuel tank 26. The wheels 88, 90 are adapted to dampen any force applied to the housing member 32 by the fuel tank 36 when it is brought into engagement with the bracket 34 and the housing member 32. In the event that the support apparatus 30 includes a tank scale, the fuel tank 26 will move upward as its fuel is consumed and the wheels 88, 90 will facilitate this movement.

Operation

Figure 7:
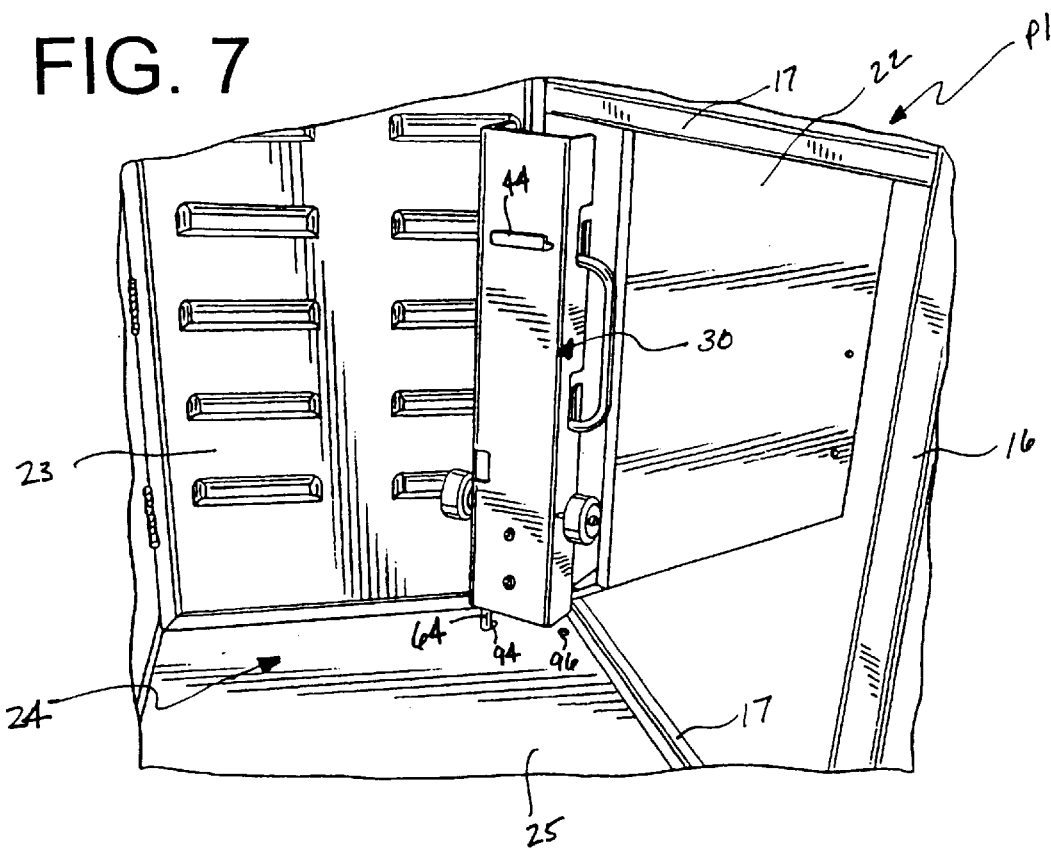
FIG. 7 is a perspective view of the support apparatus of FIG. 2, showing the support apparatus in the first position.
Figure 9:
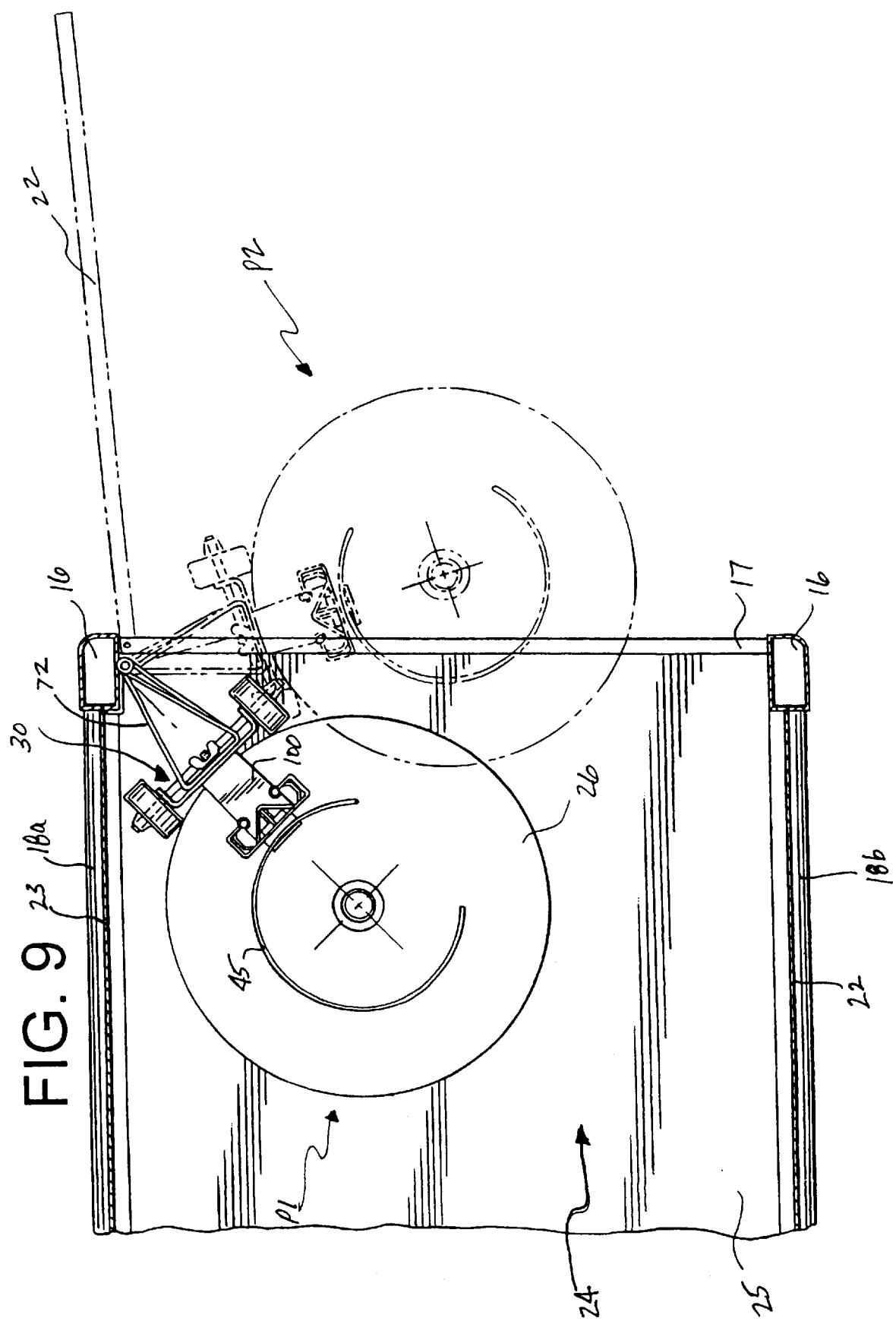

The support apparatus 30 is rotatable about the vertical axis A—A between a first position P1, wherein the fuel tank 26 is generally stored for use and a second position P2, wherein the fuel tank 26 is generally accessible. Referring to FIGS. 5, 7, and 9, the support apparatus 30 is in the first position or use position P1. In the first position P1, the support apparatus 30 and the fuel tank 26 are positioned generally within the cabinet 24. Described in another manner, in the first position P1, the support apparatus 30 and the fuel tank 26 are positioned generally within the frame assembly 14. As a result, the support apparatus 30 and the fuel tank 26 do not extend beyond the transverse frame member 17. When the support apparatus 30 is in the first position P1, the fuel tank 26 is secured for use with the grill assembly 10. This means that fuel from the fuel tank 26 can be delivered to burners or burner tubes (not shown) in the cooking chamber 12. Unlike conventional devices, in the first position P1, the support device 30 is not susceptible to unexpected or undesirable movement. A fuel line (not shown) connects the fuel tank 26 with a regulator (not shown) and/or burner tubes (not shown) positioned in the cooking chamber 12.

The support apparatus 30 is secured in the first position P1 (see FIG. 7) by the engagement of the securing member 48 with the bottom wall 25 of the frame assembly 14. The bottom wall 25 has a first means for receiving 94 the lower portion 64 of the securing member 48. The first receiving means 94 can be an aperture, channel, groove, recess, indentation, or other structure configured to receive the lower portion 64. As shown in FIG. 7, the lower portion 64 is a generally cylindrical rod that extends below the bottom wall 40 and engages the first receiving means 94. When the lower portion 64 is received by the first receiving means 94, the support apparatus 30 is located in the first position P1. Furthermore, when the support apparatus 30 is located in the first position P1 the support apparatus 30 is generally fixed or immobile.

Figure 8:
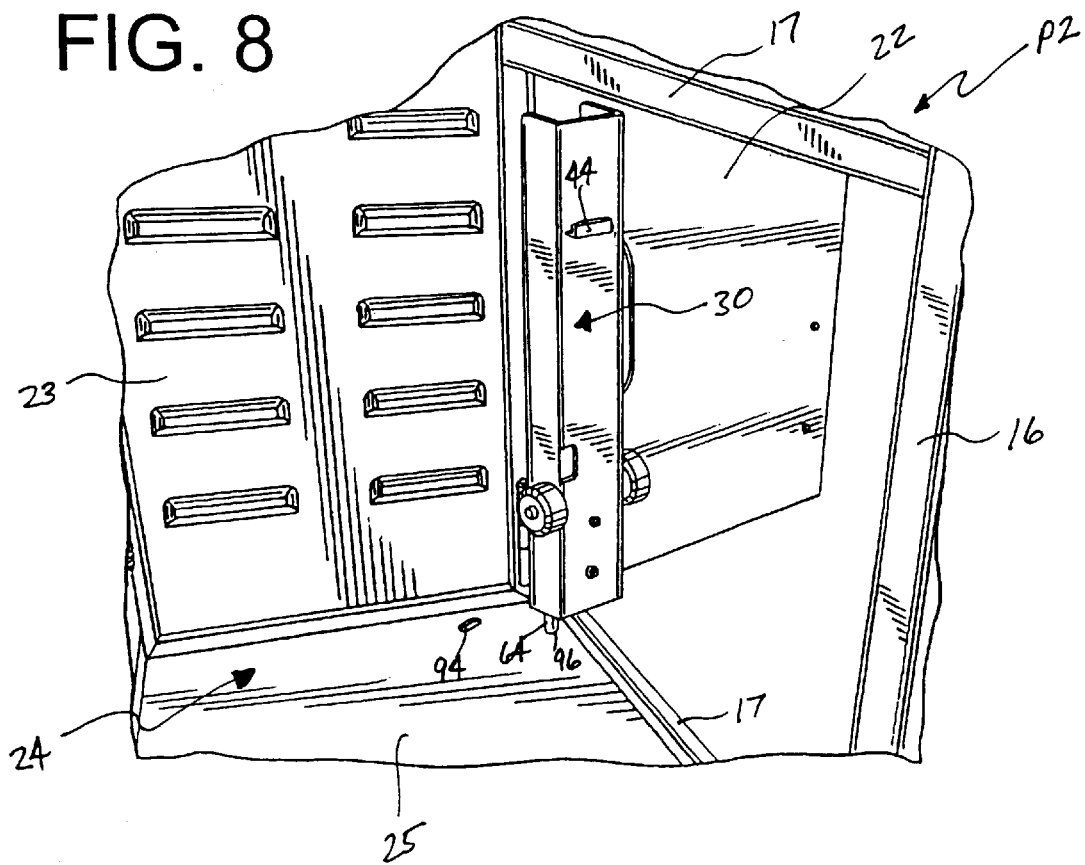
FIG. 8 is a perspective view of the support apparatus of FIG. 2, showing the support apparatus in the second position; and, FIG. 9 is a top plan view of the support apparatus of FIG. 2, showing the support apparatus in the first position and the second position.

Referring to FIGS. 6, 8, and 9, the support apparatus 30 is in the second position or access position P2. In the second position P2, a portion of the support apparatus 30 is positioned generally beyond the cabinet 24. Similarly, a portion of the fuel tank 26 is positioned generally beyond the cabinet 24. Described in another manner, in the second position P2, the support apparatus 30 is positioned generally beyond the frame assembly 14, and the fuel tank 26 is positioned generally beyond the transverse frame member 17 of the frame assembly 14. Described in yet another manner, a portion of the support apparatus 30 and a portion of the fuel tank 26 extend beyond a perimeter (see FIG. 9) defined by the transverse frame member 17 and the horizontal support members 18a, 18b. When the support apparatus 30 is in the second position P2, the fuel tank 26 is accessible, meaning that a user can detach and/or remove a spent fuel tank 26 from the support apparatus 30. Also, no portion of the frame assembly 14 precludes the removal of the spent fuel tank 26. A replacement fuel tank 26 can then be secured to the support apparatus 30. Because the fuel tank 26 extends beyond the frame assembly 14, no structure of the barbecue grill assembly 10 obstructs access to the fuel tank 26. Thus, the accessibility of the fuel tank 26 is increased and the removal and replacement of a spent fuel tank 26 is eased.

The support apparatus 30 is secured in the second position P2 (see FIG. 8) by the engagement of the securing member 48 with the bottom wall 25. The bottom wall 25 has a second means for receiving 96 the lower portion 64 of the securing member 48. The second receiving means 96 is spaced a distance from the first receiving means 94. The second receiving means 96 can be an aperture, channel, groove, recess, indentation, or other structure similarly configured to receive the lower portion 64. As shown in FIGS. 6 and 8, the lower portion 64 is a generally cylindrical rod that extends below the bottom wall 40 and engages the second receiving means 96. When the lower portion 64 is received by the second receiving means 96, the support apparatus 30 is located in the second position P2 wherein the fuel tank 26 is accessible. The degree or amount that the support apparatus 30 or the fuel tank 26 is positioned beyond the cabinet 24 varies with numerous design parameters, including but not limited to the size and configuration of the fuel tank 26 and the cabinet 24 and the positioning of the second receiving means 96.

Referring to FIG. 9, once the support apparatus 30 and the fuel tank 26 are in the second position P2, a spent fuel tank 26 can be disengaged from the tank scale 100 of the support apparatus 30. Because the fuel tank 26 is positioned generally beyond the transverse support member 17, the removal and replacement of the spent fuel tank 26 is easily accomplished without any structural obstruction from the grill assembly 10.

Alternatively, the bottom wall 25 is omitted from the frame assembly 14. In this configuration, a portion of the frame assembly 14 includes the first and second receiving means 94, 96. For example, a first projection or finger (not shown) extends from the horizontal frame member 18 and includes the first receiving means 94, and a second projection or finger (not shown) extends from the transverse frame member 17 and includes the second receiving means 96. Thus, the support apparatus 30 is secured in the first position P1 by the engagement of the securing member 48 with the first receiving means 94 and in the second position P1 by the engagement of the securing member 48 with the second receiving means 96.

The support apparatus 30 is movable between the first and second positions P1, P2 by actuating the releasable securing member 48. To move the support apparatus 30 from the first position P1 to the second position P2, a user engages the handle portion 50 of the securing member 48 and actuates it in a generally upward direction a distance sufficient to disengage the lower portion 64 from the first receiving means 94. Once the lower portion 64 is disengaged from the first receiving means 94, a user can apply a force sufficient to rotate the support apparatus 30 about the vertical axis A—A to the second position P2 (see FIG. 9). To move the support apparatus 30 from the second position P2 to the first position P1, a user engages the handle portion 50 and actuates it in a generally upward direction a distance sufficient to disengage the lower portion 64 from the second receiving means 96. Once the lower portion 64 is disengaged from the second receiving means 96, a user can apply a force sufficient to rotate the support apparatus 30 about the vertical axis A—A to the first position P1 (see FIG. 9).

The support apparatus 30 can be positioned in a transitory position (not shown) between the first and second positions P1, P2. In the transitory position, the lower portion 64 of the securing member 48 engages the bottom wall 25 of the cabinet 24. In the transitory position, a portion of the support apparatus 30 may be located beyond the transverse frame member 17 of the cabinet 24. Similarly, in the transitory position, a portion of the fuel tank 26 may be located beyond the transverse frame member 17 of the cabinet 24.

The dimensions of the support apparatus 30 can vary greatly with the dimensions of the grill assembly 10. Preferably, the dimensions of the support apparatus 30 correspond to the dimensions of the frame assembly 14 and/or the cabinet 24. Accordingly, the height or length of the support apparatus 30 is generally less than the height of the cabinet 24. In this manner, neither the frame assembly 14 nor the cabinet 24 obstruct the movement of the support apparatus 30.

The support apparatus 30 can be manufactured from plastic, steel, aluminum, or other metals, including metal alloys. The support apparatus 30 can be formed in a number of ways, including cast or stamped processes.

In another preferred embodiment, the support apparatus 30 is operably connected to an outdoor cooking device (not shown) comprising a gas burner connected to a frame assembly. The frame assembly is formed from a combination of frame members, including vertical, horizontal, and/or transverse members. The frame assembly is adapted to be generally mobile. The frame assembly defines an interior cavity or cabinet that has dimension sufficient to receive the fuel tank 26. As disclosed above, at least one hinge 72 connects the support apparatus 30 to the frame assembly.

The support apparatus 30 is movable between a first position P1 wherein the fuel tank 26 is stored for use, and a second position P2 wherein the fuel tank 26 is accessible for removal and/or replacement. In the first position P1, the support apparatus 30 and the fuel tank 26 are positioned generally within the frame assembly and the cabinet. In the second position P2, the support apparatus 30 and the fuel tank 26 are positioned generally beyond the frame assembly and the cabinet.

The support apparatus 30 of the present invention provides a number of significant advantages over conventional fuel tank support devices. When the support apparatus 30 is in the first position P1, the fuel tank 26 is stored within the cabinet 24 and not exposed to outdoor elements. In contrast, most conventional support devices are positioned external to the cabinet and consequently expose the fuel tank to outdoor elements. Also, when the support apparatus 30 is in the second position P2, the fuel tank 26 is easily accessible for removal when the fuel is spent. Finally, movement of the support apparatus 30 from the first position P1 to the second position P2 facilitates removal of the fuel tank 26, and from the second position P2 to the first position P1 facilitates replacement of the fuel tank 26. In the event that the conventional support devices are located within the cabinet, the support devices are stationary and are incapable of movement. Accordingly, the ease of removal and replacement of the fuel tank is compromised with conventional support devices.

Another benefit of the present invention relates to shipping and packaging concerns of the barbecue grill assembly 10. The first position P1 provides a secure and stable arrangement for the fuel tank 26 within the cabinet 24, such that the barbeque grill assembly 10 can be packaged, shipped, and delivered with the fuel tank 26 connected to the support apparatus 30. In contrast, conventional support devices inadequately support the fuel tank for packaging and shipping concerns.

While the specific embodiments have been illustrated and described, numerous modifications come to mind without significantly departing from the spirit of the invention and the scope of protection is only limited by the scope of the accompanying claims.

What is claimed is:

1. A barbecue grill assembly comprising:
   a cooking chamber connected to a frame assembly, a portion of the frame assembly defining a cabinet; and,
   a fuel tank support apparatus pivotally connected to a portion of the frame assembly, the support apparatus having: (i) a housing member with a bracket configured to engage a portion of the fuel tank, (ii) a releasable securing member operably connected to the housing member; and, (iii) a spring member operably connected to the securing member.

2. The barbecue grill assembly of claim 1 wherein the support apparatus is pivotally connected to a vertical frame member of the frame assembly.

3. The barbecue grill assembly of claim 2 wherein the frame member defines a vertical axis and the support apparatus pivots about the vertical axis.

4. The barbecue grill assembly of claim 1 wherein the support apparatus is movable between a first position wherein the fuel tank is stored for use within the cabinet, and a second position wherein the fuel tank is accessible, and wherein the releasable member secures the support apparatus in one of the first or second positions.

5. The barbecue grill assembly of claim 4 wherein a lower portion of the releasable member engages a first portion of the cabinet in the first position.

6. The barbecue grill assembly of claim 5, the first portion of the cabinet having first means for engaging the lower portion of the releasable member.

7. The barbecue grill assembly of claim 6 wherein the first engaging means is an aperture.

8. The barbecue grill assembly of claim 5 wherein the lower portion of the releasable member engages a second portion of the cabinet in the second position.

9. The barbecue grill assembly of claim 8, the first portion of the cabinet having second means for engaging the lower portion of the releasable member.

10. The barbecue grill assembly of claim 9 wherein the second engaging means is an aperture.

11. A support apparatus for a fuel tank used with a barbecue gull, the support apparatus comprising:
    a housing member having a bracket adapted to engage a portion of the fuel tank, the housing member movable between a first position, wherein the fuel tank is stored for use, and a second position wherein the fuel tank is accessible;
    a releasable member operably connected to the housing member, the releasable member adapted to secure the housing member in at least one of the first or second positions; and,
    a spring member connected to the releasable member.

12. A support apparatus for a fuel tank used with a barbecue grill, the support apparatus comprising:
    a housing member having a bracket adapted to engage a portion of the fuel tank, the housing member movable between a first position and a second position where the fuel tank is accessible, wherein the housing has a channel defined by an outer wall, a first side wall, and a second side wall of the housing;
    a releasable member operably connected to the housing member within the channel, the releasable member adapted to secure the housing member in at least one of the first or second positions; and,
    a spring member connected to the releasable member within the channel.

13. The movable apparatus of claim 12, wherein the first side wall has a first slot adapted to receive a first portion of the releasable member.

14. The movable apparatus of claim 13, wherein the first side wall has a second slot adapted to receive a second portion of the releasable member.

15. A barbecue grill assembly comprising:
    a cooking chamber connected to a frame assembly; and,
    a support apparatus for a fuel tank, the support apparatus pivotally connected to a portion of the frame assembly, the support apparatus having a housing member with a bracket adapted to engage a portion of the fuel tank, the support apparatus movable between a first position wherein the fuel tank is substantially within the frame assembly, and a second position wherein the fuel tank is substantially beyond the frame assembly, the support apparatus further having a releasable member and a spring member operably connected to the housing member and adapted to secure the support apparatus in one of the first or second positions.

16. The barbecue grill assembly of claim 15, wherein the frame assembly is formed from a combination of horizontal frame members, vertical frame members, and transverse frame members.

17. The barbecue grill assembly of claim 16, wherein the support apparatus is pivotally connected to a vertical frame member.

18. A barbecue grill assembly comprising:
    a cooking chamber connected to a frame assembly, a portion of the frame assembly defining a cabinet with a bottom wall; and,
    a movable support apparatus for a fuel tank, the support apparatus pivotally connected to a portion of the cabinet and movable between a first position wherein the fuel tank is stored for use, and a second position wherein the fuel tank is accessible, the support apparatus having a housing member with a bracket adapted to engage a portion of the fuel tank, the support apparatus further having a releasable securing member operably connected to the housing member wherein the releasable member secures the support apparatus in the first position or the second position.

19. The barbecue grill assembly of claim 18, further comprising at least one hinge operably connected to a portion of the cabinet and the support apparatus.

20. The barbecue grill assembly of claim 18, wherein in the second position, the fuel tank is accessible such that a user can remove the fuel tank.

21. The barbecue grill assembly of claim 18, the first portion of the bottom wall having means for engaging the lower portion of the releasable member.

22. The barbecue grill assembly of claim 18, the second portion of the bottom wall having means for engaging the lower portion of the releasable member.

23. The barbecue grill assembly of claim 18, wherein the fuel tank is positioned substantially within the cabinet in the first position.

24. The barbecue grill assembly of claim 18, wherein a portion of the fuel tank extends beyond the cabinet in the second position.

25. The barbecue grill assembly of claim 18, wherein the support apparatus is positioned substantially within the cabinet in the first position.

26. The barbecue grill assembly of claim 18, wherein a portion of the support apparatus extends beyond the cabinet in the second position.

27. An outdoor cooking device comprising:
a burner connected to a frame assembly; and,
a support apparatus for a fuel tank, the support apparatus pivotally connected to a portion of the frame assembly, the support apparatus having a housing member with a bracket adapted to engage a portion of the fuel tank, the support apparatus pivotable between a first position wherein the fuel tank is stored for use, and a second position wherein the fuel tank is accessible, the support apparatus further having a releasable member and a spring member operably connected to the housing member and adapted to secure the support apparatus in one of the first or second positions.

28. The outdoor cooking device of claim 27, further comprising at least one hinge operably connected to a portion of the frame assembly and the support apparatus.

29. The outdoor cooking device of claim 27, wherein in the second position, the fuel tank is accessible such that a user can remove the fuel tank.

* * * * *

UNITED STATES PATENT AND TRADEMARK OFFICE
CERTIFICATE OF CORRECTION

PATENT NO. : 6,694,967 B2
DATED : February 24, 2004
INVENTOR(S) : James C. Stephen et al.

Page 1 of 1

It is certified that error appears in the above-identified patent and that said Letters Patent is hereby corrected as shown below:

Column 9,
Line 65, delete "gull" and insert -- grill -- therefor.

Signed and Sealed this

Twenty-third Day of November, 2004

JON W. DUDAS
*Director of the United States Patent and Trademark Office*